Aug. 11, 1942.  R. M. HOFMANN  2,292,638
VARIABLE SPEED DRIVE
Filed March 26, 1940  3 Sheets-Sheet 2
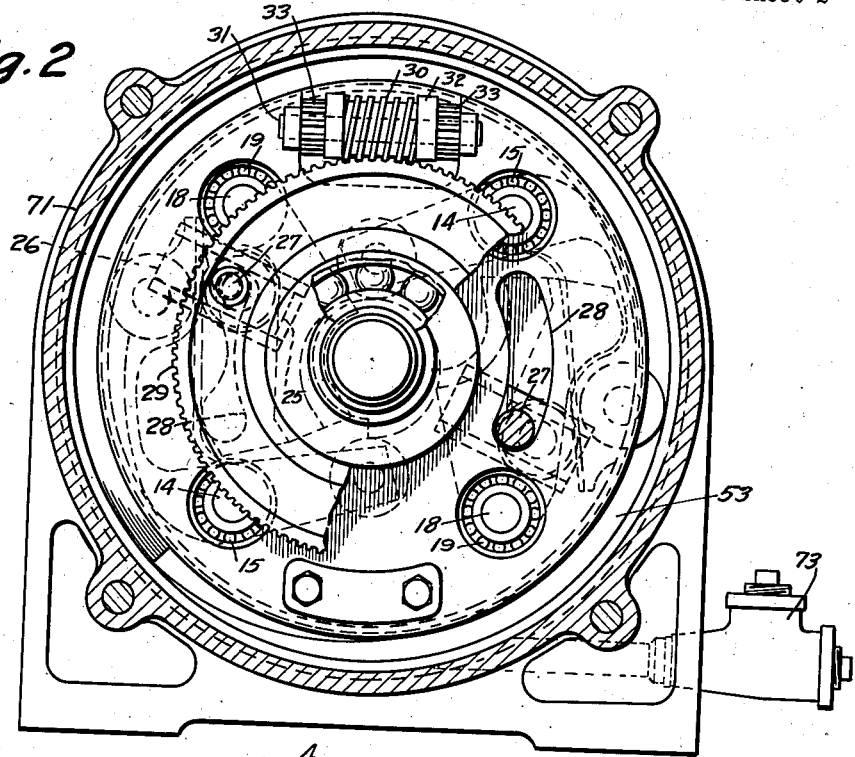
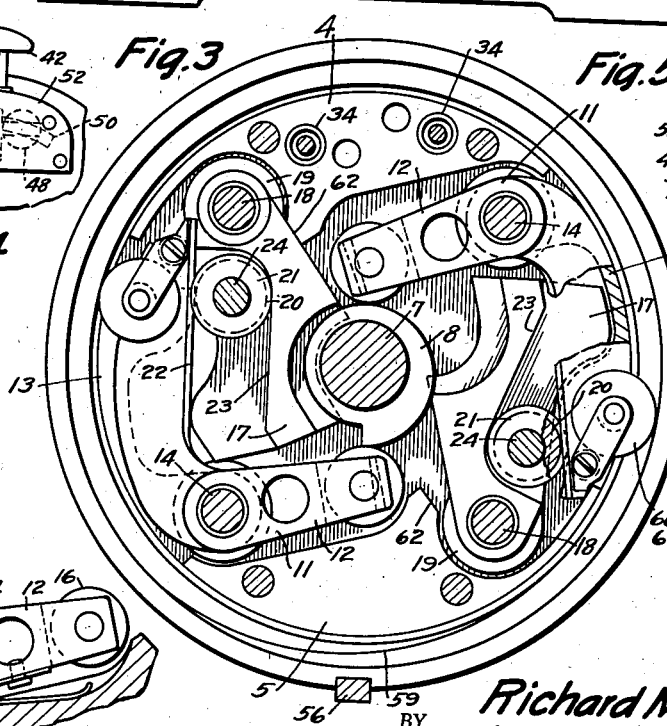
INVENTOR.
Richard M. Hofmann
BY James Harrison Bowen
ATTORNEY.

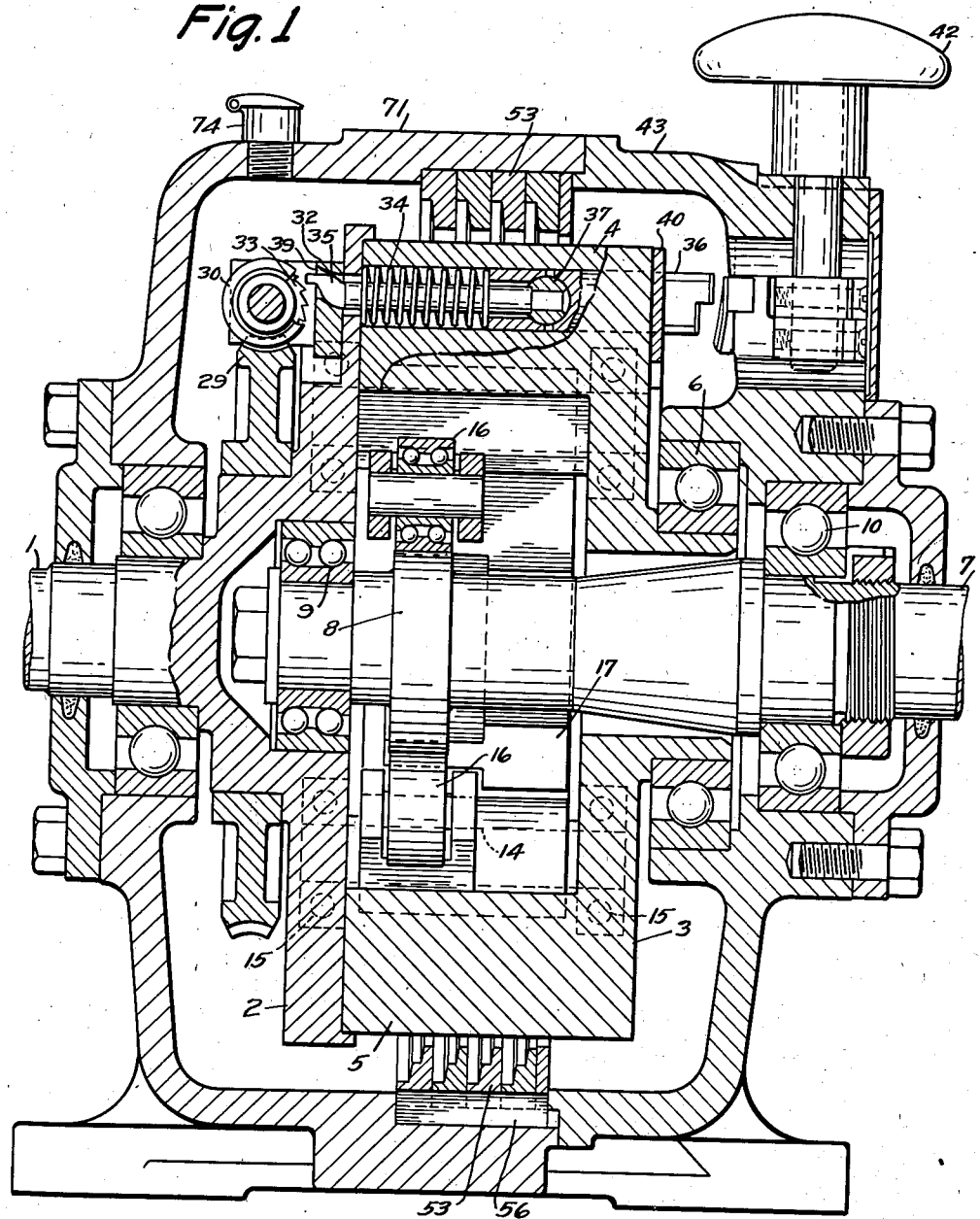

Aug. 11, 1942.

R. M. HOFMANN 2,292,638

VARIABLE SPEED DRIVE

Filed March 26, 1940

INVENTOR.
Richard M. Hofmann
BY
James Harrison Bowen
ATTORNEY.

Patented Aug. 11, 1942

2,292,638

UNITED STATES PATENT OFFICE 2,292,638

VARIABLE SPEED DRIVE

Richard M. Hofmann, Floral Park, N. Y.

Application March 26, 1940, Serial No. 326,020

25 Claims. (Cl. 74—64)

The purpose of this invention is to provide a variable speed drive, which when used in motor vehicles, will make possible the elimination of the clutch pedal and gear shift lever and enable driving under all traffic conditions, and also up and down grades with the use of the accelerator and brake only.

The invention relates to such mechanical devices for industrial and automotive application, producing a speed difference between the driving and driven member either by a "slip" of the driven member relative to the driving member, or by making use of centrifugal forces; and the objects of the invention are, first, to afford facilities for the transmission of power from the driving to the driven member independent of frictional contact between these elements; second, to have the power transmission continuous; third, to make provision for an adjustment of the power transmitting capacity; fourth, the arrangement of the mechanism in such a manner that the speed reduction thereof can be changed when the mechanism is at rest or active, by either a manual or automatic control; and fifth, to eliminate any energy loss by feeding back to the driving member the potential energy present when the centrifugal masses rotate at their reduced radius of gyration and that is being released when the masses return to their outer positions.

Other features and advantages of the invention will appear from the following description taken in connection with the drawings, wherein:

Figure 1 is a vertical longitudinal section through the device.

Figure 2 is an end elevation with the housing shown in section and parts broken away.

Figure 3 is a similar section with the driving member and housing omitted.

Figure 4 is a detail showing the speed control or speed reducing or increasing knob.

Figure 5 shows a spring ball for returning the knob to the neutral position.

Figure 6 shows an alternate design in which a spring is used on the follower arms.

Figure 7 shows the feed-back roller mounting.

Figure 8:
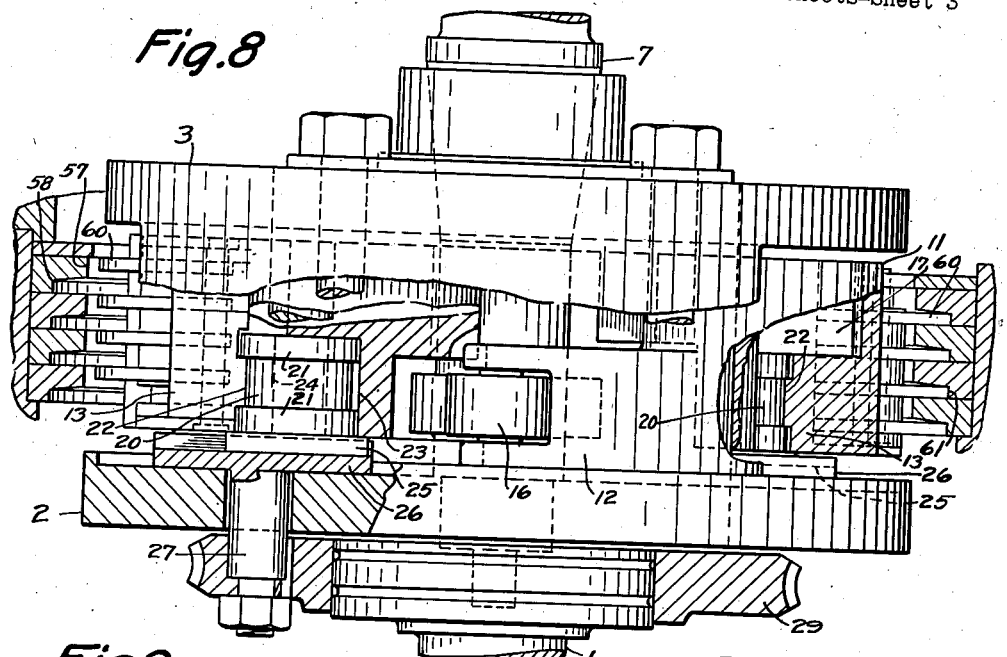
Figure 8 is a plan view with parts omitted and parts broken away.
Figure 9:
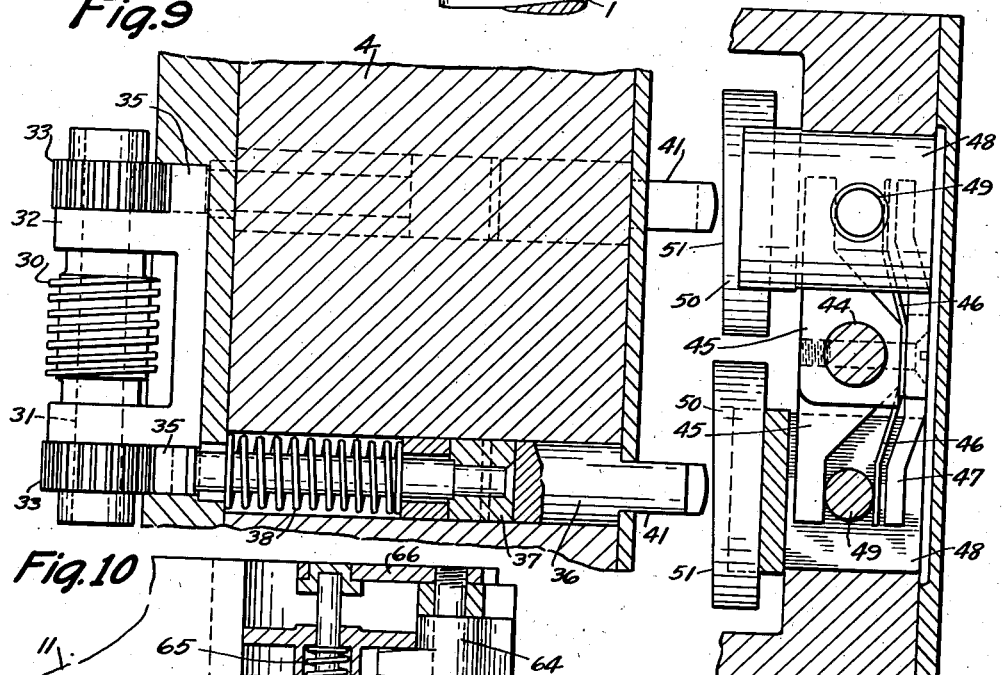
Figure 9 is a sectional plan through the control mechanism for reducing or increasing the speed.
Figure 10:
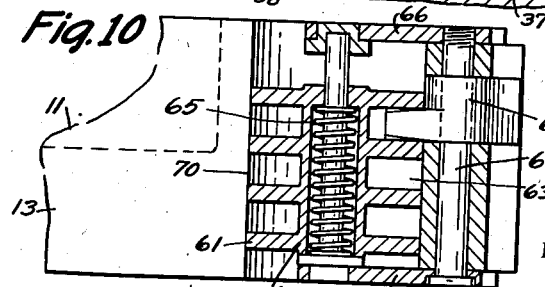
Figure 10 is a section through the feed-back roller and mounting thereof.

In the drawings the device is illustrated as it may be made wherein numeral 1 indicates a driving shaft having an enlarged or flanged end 2 integral therewith and this is attached to a corresponding member 3 having relatively solid intermediate sections 4 and 5 providing the connecting means with the member 2 and through which bolts connecting the two parts pass, and the member 3 is journaled through a bearing 6 in the far or driven end of the housing. A similar bearing is provided on the drive shaft at the opposite end of the housing. A driven shaft 7 having a cam 8 thereon extends into the parts 2 and 3 and the inner end is journaled in the member 2 through a bearing 9 with the outer end thereof journaled in the housing beyond the bearing 6 through a bearing 10, thereby supporting the driven shaft at two points.

L shaped levers forming cam followers 11, two being shown and spaced 180° apart, connect the driving member and the driven shaft, and these have inner legs 12 of relatively light weight, and outer legs 13 which are designed to contain material in bulk for maximum weight, as the cam followers rotate with the high speed member and the effective masses of the legs 13 produce a centrifugal force, which is impressed upon the cam 8, compelling the driven shaft 7 to rotate with the driving shaft 1. The followers 11 are fulcrummed on pins 14 freely mounted in bearings 15 and their inner ends are provided with rollers 16 that ride upon the surface of the cam 8.

The driving member must first attain a predetermined speed before it can pick up the load, and when it reaches this speed the speed of the driven member will then increase gradually. Without speed difference between driving and driven members, no power transmission is possible. Under proper operating conditions, such as the driven member driven from the driving element, the movement of the driven member relative to the driving element is always negative. In operation one cam 8 displaces both followers, each displacement taking up 180° of one full relative turn between the two main members. This alternating displacement assures continuous action. Each cam folower has to resist the full torque being transmitted. A feed-back mechanism, as hereinafter described, prevents the followers 11 from returning before the cam 8 is sufficiently advanced to prevent an interference between the cam roller 16 and the cam, however it will be understood that any other means may be used for this purpose. The return of the followers must be independent, that is, not influenced by the movement of the driven member.

For the purpose of illustration, it may be assumed that the legs 12 of the followers 11 are pushed toward the axis, not by centrifugal force pulling on the opposite legs, but by springs anchored on each follower and bearing on the parts 4 and 5 of the driving member as shown in Figure 6. If the driven shaft 7 is prevented from turning, with the drive shaft rotating, then the cam 8 will actuate the followers 11 and the followers the springs. To deflect the springs a certain force is required, and by turning the driving member a number of times an amount of work is done which can be expressed in foot pounds. Of course the same is true when stopping the driving shaft and turning the driven member, but in the opposite direction.

If the driving member is turned about its axis ten times a minute in a positive, clockwise direction, the driven member has to be turned ten times in a negative or counterclockwise direction, relative to the driving member, to appear stationary, relative to a fixed point. Increasing the speed of the driving member to +20 R. P. M. will increase the speed of the driven member to +10 R. P. M. if the relative counterclockwise movement of —10 R. P. M. is maintained. To get the delayed movement of the driven shaft the latter must be restrained in following the driving member by a negative force. With +20 R. P. M. for the drive shaft and +10 R. P. M. for the driven shaft, the speed difference equals 10 R. P. M., and therefore the follower and spring is, as above, actuated 10 times per minute. In other words the energy necessary to deflect the spring 10 times per minute is the same which prevented the driven shaft from turning. Consequently the drag at the driven shaft to produce a speed difference of 10 R. P. M. must be equal the energy absorbed by the spring within the same time limit. By increasing the speed still higher, so the centrifugal force of the legs 13 is sufficient to take the place of the force exerted by the spring, the above parts remain the same. Of course the spring can be retained as a regular part of the device, either to supply an initial force before the device has attained any speed, as an additional force, or just to keep the followers in place when the device is inactive.

The power required to displace the follower, within the same time interval, is constant. When power and power reaction, acting upon cam 8 are balanced, then their algebraic sum equals the power supplied. The products of torque and speed of the transmitted and absorbed power must be equal, and half of the power supply. A torque increase at the driven shaft naturally tends to increase the speed difference between driving and driven members.

The resulting speed increase of the followers would be in an inverse proportion to the speed decrease of the driven shaft. Since the number of displacements would increase and the centrifugal force remains constant the product of both shows an increase of absorbed power over the fixed portion of half of the power supply. The algebraic sum of power reaction and transmitted power is above the power supply, and to regain power balance the centrifugal force must be decreased. This can be accomplished, either by an increasing or decreasing weight, attached to or incorporated in the leg 13 of follower 11, or by a separate, constant weight acting upon the follower leg 13 in a changeable distance from the follower fulcrum.

In the illustrated design, weights 17 are added and mounted separately, on the driving member. These are attached to shafts 18 journaled in two bearings 19. The relative positions of followers and weights are such that both parts, in conjunction with follower rollers 20 and weight rollers 21, comprise a variable stroke lever mechanism. The latter provides a simple means of transmitting a variable oscillating movement from the followers to the adjacent weights, just by changing the position of the rollers. The oscillating in and out movement of the followers about the axis remains constant, while the oscillating movement of the weights about their axis can be varied to requirements.

Followers 11 transmit the smallest angular movement to the weights 17 when the rollers 20 and 21 are in a position close to the follower axis. The largest angular movement of the weights is obtained with the rollers in a position close to the weight axis. Track surfaces 22 on the follower legs 13 and track surfaces 23 on the weights 17 are set parallel when the followers and weights are at their inner positions, that is near the axis. Due to the relative positions of follower and weight axes the oscillating movement of these parts will cause a slight shifting of the rollers on their respective tracks. To assure true rolling action for the rollers, the follower roller, which is the central part of the rollers, is of greater width and smaller in diameter than the outer portions, and this contacts the follower track only, while the two narrow and larger diameter rollers forming the outer portions, contact and track surfaces of the weights only. The close fit between rollers and adjacent parts tends to keep the rollers aligned. This, however, does not eliminate the necessity for a roller shaft as indicated by the numeral 24, and this shaft has, at one end a rectangular slide plate 25 integral therewith, and the slide plate is slidable in a slide plate guide 26.

During the oscillating movement of followers and weights the shaft with the slide plate moves radially, relatively to the axis, in the slide plate guide. The slide plate guides are rigidly attached to a worm wheel 29, located at the drive shaft side of the driving member, and the enlarged portion of the driving member is provided with circular slots 28 through which studs 27 on the slide plate guides extend, and these studs are attached to and held in the worm gear. These slots are sufficiently long to cover the whole, possible movement of the rollers along their tracks, and also act as stops at the extreme roller positions. If suitable arrangements are made to clamp the worm gear 29 against the driving member, fixed settings for different torque transmitting capacities can be had. Since the slide plate guides of all of the followers are rigidly connected with the worm gear a synchronized adjustment for all slide plate guides is assured.

Moving the rollers away from the follower axis increases not only the angular movement of the weights, but in addition the leverage of the centrifugal force transmitted to the followers is favorably effected. Power transmitting capacity of the device is constant for each roller position, assuming that all other conditions are unchanged. Additional drive speed increases the centrifugal force and therefore the power transmitting capacity.

A manual or automatic control, to take care of torque or speed changes without stopping the drive or interrupting the torque, rather than fixed capacity settings, is necessary to make the mechanism adapted for variable speed transmission. Such a torque resistance control is equivalent to means of controlling the positions of rollers 20 and 21 relative to the follower axis. The following describes a manual control which may be operated while the device is in operation.

For a more frequent change of the torque transmitting capacity clamping the wheel proves already cumbersome and it is necessary to consider other mechanisms, than outlined above, for setting the rollers. To satisfy this requirement the worm wheel meshes with a worm 30, and due to the self-locking characteristics of worm gears the guide 26 including the slide plates and rollers are absolutely secured in their positions. A turning movement of the worm 30 in one direction or the other is therefore sufficient to change the torque transmitting capacity of the device. This adjustment, of course, can only be made when the device is at rest, and therefore in order to make the adjustment with the device rotating and without interrupting the torque it was found necessary to incorporate a ratchet mechanism in the device.

The worm 30 is mounted on a shaft 31 held in bearings in a bracket 32 on the driving member 2, and outside of the bearings are two ratchet wheels 33. Slidable in two holes 34 are ratchet pawls 35, the holes being parallel to the axis of the device and positioned in the member 4 of the end piece 3. One pawl engages its ratchet wheel above the center and the other below causing rotation of the worm in opposite directions. The inner ends of the pawls 35 are connected to pawl plungers 36 by hinges 37, and the outer ends are guided by slots 39 in the base of the bracket 32, and each actuating stroke of the pawl plunger induces the pawl to follow the angular motion of the ratchet sprocket. A spring for the control of this movement is avoided to forestall any functional disturbance caused by centrifugal force. The worm bracket 32 at one side and a shield 40 at the opposite side retain the pawl parts in their respective holes. Flat surfaces 41 on the pawl plungers and correspondingly shaped openings in the retainer plate or shield 40 prevent a rotating motion of the pawls. Cams in combination with return springs 38 give the pawls a reciprocating motion.

The pawls are actuated from the exterior of the casing by a knob 42 on the outside of the case cover 43 and mounted on a shaft 44 with two arms 45 clamped on the lower end thereof. Flat springs 46 with guard plates 47 are provided to bear against the arms to act as a safety device when the rollers reach their extreme positions. The arms 45 extend into cam plungers 48 and engage pins 49 therein and as the knob 42 is turned it will move one of the cam plungers inward and ring sectors 50 therein will also move inward so that the face 51 thereof will be in the path of the inner end of the pawl plunger and cause the pawl and worm to operate the worm wheel as the end of the plunger passes. These parts are enclosed in a bulge in the case cover and covered by a plate 52. It will also be noted that by turning the knob in the opposite direction the other sector 50 will be moved into the path of the other pawl plunger and this will operate the worm gear in the opposite direction. When the knob is released a spring ball 55 seated in a recess in one of the cam plungers will return it to the neutral position. Therefore turning the knob in one direction or the other causes a speed increase or decrease of the driven member, as operating the pawls by the members 50 increases or decreases the angular velocity of the worm wheel relative to the velocity of the driving member.

The power transmitted by the drive is the same as the power absorbed by the displacement of the centrifugal weights. Only one-half of the energy supplied to the driving member is available at the driven shaft. To utilize the mechanism for continuous and efficient speed reduction and as a torque converter the energy absorbed by the weights must be reclaimed when the weights return to their outer positions, by adding the released potential energy to the power supplied by the power source. This return can only be effected through an additional member and this must be mounted rigidly on the casing. This additional member is an internal cam and herein is termed a "feed-back" cam 53, and it is anchored in the casing by a key 56. The legs 13 of the cam followers 11 are in contact with the feed-back cam and to facilitate the movement the ends of the opposite legs are provided with cam rollers 60. In the design illustrated in the drawings only one cam slope 59 is shown extending over about 90° of the total cam circumference. The relative position of the follower axis and the cam curve is such as to create a tangential component which tends to pull the driving member 2 around its axis. Sufficient acceleration by the centrifugal force to the follower is therefore necessary to impress the tangential force on the feed-back cam. The return movement of one follower must be complete before the other follower is ready to discharge its stored energy. With one cam slope 59 on the feed-back cam for each 1¼ revolutions of the driving member one feed-back cycle is possible. As provision is made for two cam followers 11 and an active cam portion of 180° on the cam 8, the number of feed-back cycles per minute may change from zero to a number twice the number of revolutions per minute of the drive shaft, for the largest speed difference, that is, when the driving member is running at its proposed speed and the driven member is not turning.

After the cam roller 16 is leaving the active portion of the cam 8 the legs 13 of the followers 11 through their cam rollers 60 may contact the feed-back cam at any point of its circumference, which includes the cam slope 59, but to regain all of the absorbed energy, the cam follower must start its outward movement at the beginning of the cam slope. Suppose the cam roller 60 contacts the cam slope 59 at any place between the beginning and end of same, then the feed-back cycle should not commence until the cam roller 60 reaches the slope again, or the starting point of the next cam slope, whenever a number of slopes or turns are provided. For each cycle of weight displacement (180° movement of the cam 8) two cam slopes 59 of equal angular size within 180° of the feed-back cam are necessary to assure the completion of one feed-back cycle before the other one starts. Consequently four cam slopes or turns of equal angular extent, are necessary for a maximum speed difference between driving and driven members. After leaving a cam slope the follower must remain in its outer position until forced to its inner position by the cam 8, as, as the follower rotates with the driving member an interference of the cam roller 60 with the sloped cam portion is to be avoided. For this reason the feed-back cam has a circular inner running surface 57, and a circular outer running surface 58 to accommodate the cam roller. Between the continuous ring surfaces is the actual cam slope 59 or a plurality thereof, extending over their allotted portion of the cam circumference. The outer ring surface 58 may be a separate ring, and as provision is made to limit the oscillating follower movement by stops 62, there is no need for the cam roller 60 to actually touch the running surface 58. The division of the feed-back cam into three distinct sections, in three different planes, necessitates an axial movement of the cam roller 60, to shift from one section to the other as required during the feed-back cycle.

The cam roller contacts first the inner circular running surface 57 and as soon as the cam roller approaches the starting point of a cam slope the peculiar cam design will guide it into the slope and the feed-back cycle begins. The follower leg 13 and the weight 17 move away from the drive axis and at the same time the cam roller is forced by the three dimensional cam slope 59 to move axially. Approaching the end of the slope the cam roller 60 is then in line with the outer running surface 58 and continues to revolve in this position until a new displacing cycle occurs. In order to reduce the axial movement of the cam roller 60 to a minimum, the three cam sections are kept small, and in order not to exceed normal surface pressure between the roller and cam, a number of such small cams, four being shown, are used. Correspondingly on the cam roller there have to be provided four running surfaces 61 separated by three grooves 63, and these are sufficiently deep to cover the drop of the feed-back cam slope. The pressure upon the cam roller 60 is taken up by the circular roller seat 70 in the end of the follower leg 13, and the two side plates 66 and 67, held in place by the screw 68, act primarily as retainers, holding the parts in place. Before the cam roller can return to its original axial position it must remain in its extreme outer position for an undetermined time, and during this time a lock 64, engaging with one of the cam roller grooves 63 securely retains the roller in this position. The lock 64 comes into action near the end of the outward movement of the follower leg 13, when the lock strikes the stop 62, and on the return movement of the follower the cam roller is released as soon as the lock contacts the weight. After the lock is released the cam roller is returned to its original position by a spring 65 within the cam roller, the bearing plate 67 providing an abutment for the end of the spring.

The irregular and intermittent succession of displacing and feed-back cycles makes a functional synchronization of driving, driven, and a stationary drive member a difficult task, but with the arrangement outlined herein a feed-back of energy into the drive can be efficiently accomplished. The intermittent impulses of the feed-back mechanism on the driven member are equalized by the inertia of the rotating masses.

When the device is started only half of the power is available at the driven shaft, the other half being used to energize the mechanism, but after the reacting power is built up, and the first full force feed-back cycle is completed, the full engine power is transmitted. The absorbed power fed back is used to displace the weights again, or in other words, this power is just circulating to keep up the resistance in the device, however losses due to friction must be replenished from the power source.

A suitable housing 71 encloses the entire mechanism, and as this is partly filled with oil all of the parts are efficiently lubricated. The housing may be provided with an oil fill connection 73 that may also be used as a drain, and an oil cap 74 may be provided at the top which will, when replenishing with oil, provide a vent.

Having thus fully described the invention what I claim as new desire to secure by Letters Patent, is:

1. A variable speed drive comprising a driving member, a driven member, a cam on the driven member, cam followers providing connecting means between the driving and driven members and mounted on the driving member, weights on the driving member positioned to influence the cam followers, rollers providing the connecting means between the weights and followers, means adjusting the positions of the rollers, an internal stationary cam surrounding the followers and weights, and contacting rollers in the ends of the followers operating in the internal cam providing feed-back means for the potential energy absorbed by the weights.

2. A device as described in claim 1, in which all of the parts are enclosed in a unique common housing.

3. A device as described in claim 1, having means changing the positions of the rollers between the followers and weights while the device is operating.

4. A device as described in claim 1, characterized in that the relative positions of the parts is controlled by a worm and gear on the driving member with the worm rotated by ratchets operating through the driving member when engaged by cams in a surrounding housing, and with the positions of the cams adapted to be adjusted by a knob on the exterior of the casing.

5. In a variable speed drive having a driving member and a driven member, the combination of two cams, one attached to the driven member and the other stationary, and an intermediate element mounted on the driving member contacting both of the cams alternately providing the connecting agent between the driving and driven members.

6. A device as described in claim 5, in which the stationary cam is an internal cam positioned concentric with the drive axis.

7. A device as described in claim 5, in which the stationary cam is an internal cam in which the start and end of the cam slope or slopes in a different plane axially.

8. A variable speed drive having a driving member and a driven member in a housing characterized by L shaped levers pivotally mounted on the driving member with their inner ends engaging a cam on the driven member and their outer ends engaging cam surfaces in the housing, said levers providing the connecting means between the driving and driven members.

9. A device as described in claim 8, having feed-back cam rollers in the outer ends of the levers and means providing an axial movement thereof.

10. A device as described in claim 8 having axially movable rollers in the outer ends of the levers providing the engaging means thereof with the cam surfaces in the housing in which the rollers are displaced axially by the slope of the said cam surfaces and returned to their starting positions by springs.

11. A device as described in claim 8, having axially movable rollers in the outer ends of the levers providing the engaging means thereof with the cam surfaces in the housing in which the rollers are displaced axially by the slope of said cam surfaces and returned to their starting positions by springs, and the return movement of the rollers is controlled by locks which release the rollers when the weights of the outer ends of the levers are at their inner positions.

12. A device as described in claim 8, in which the cam radius at the end of the active cam portion is reduced to approximately the starting radius of the cam curve.

13. In a variable speed drive having a driving member and a driven member, the combination of two cams, one integral with the driven member and the other stationary, and cam followers contacting first one cam and then the other, thereby exerting a force alternately upon the driven member and the driving member through a fixed member, during one negative revolution of the driven member relative to the driving member.

14. A device as described in claim 8, having axially movable rollers in the outer ends of the levers providing the engaging means thereof with the cam surfaces in the housing in which the rollers are displaced axially by the slope of said cam surfaces and returned to their starting positions by springs, and locks locking the rollers when the locks contact lever stops and releasing the rollers when the locks engage the outer ends of the levers.

15. A variable speed drive for industrial and automotive use comprising in combination a driving and a driven member, mechanical constant stroke displacing means on the driven member, a plurality of displaceable transmitting means to transmit forces influencing the driven member to a like number of separate resistance means to resist said forces, both mounted on the driving member, means to vary the displacement stroke of the resistance means and simultaneously the leverage for the resisting force acting upon the transmitting means; a stationary reaction member and transmitting means, acting independent from the displacing means, to transmit the energy stored in the resistance means after displacement thereof, through the reaction member to the driving member as an additional driving force, this energy return being accomplished in an alternating sequence with the displacing cycle and during one relative revolution between driving and driven member.

16. In a variable speed drive the combination of a plurality of pivoted levers mounted equally spaced on the driving member and constant stroke mechanical displacing means on the driven member contacted by said levers, having each lever, after its maximum displacement, cease contact with the displacing means for the duration of the lever return.

17. In a variable speed drive the combination of a plurality of pivoted levers mounted, equally spaced, on the driving member, and a cam on the driven member contacted by said levers, having each lever cease contact with the cam by discontinuing the cam slope and returning the latter to the cam base line after the maximum lift for the levers is reached.

18. In a variable speed drive the combination of drive members as described in claim 7, wherein the relative position of the intermediate element is controlled by a worm and gear on the driving member with the worm rotated by ratchets operating through the driving member when engaged by cams in a surrounding housing, and with the positions of the cams adapted to be adjusted by a knob on the exterior of the casing.

19. In a variable speed drive the combination of a plurality of pivoted levers mounted equally spaced on the driving member and engaging a stationary reaction member, and a like number of pivoted levers mounted equally spaced on the driving member contacting the constant stroke, mechanical displacing means on the driven member having each combination of these two levers pivoting on a common axis.

20. In a variable speed drive the combination of levers as described in claim 19, having the levers with a common axis rigidly connected with each other by suitable means or integral with each other.

21. In a variable speed drive the combination of constant stroke mechanical displacing means, a stationary reaction member located concentric with the drive axis, and a plurality of intermediate elements mounted equally spaced on the driving member contacting the displacing means and the stationary element alternately during one relative revolution between driving and driven member.

22. In a variable speed drive the stationary reaction member comprising in combination an annular running surface with a radius equal to the starting radius of the cam slope of an adjacent cam with one or more cam slopes, and a circular running surface adjacent to the cam with a radius equal to the finish radius of said cam slope.

23. In a variable speed drive the combination of a stationary reaction member and a plurality of intermediate elements mounted equally spaced on the driving member, the intermediate elements being equipped with rollers which can be brought in contact with either one of the three stationary reaction member components.

24. In a variable speed drive the combination of members as described in claim 23, having the rollers brought in contact with the stationary reaction members by their displacement in an axial direction by a cam being part of the stationary reaction member and returned to their starting position by springs.

25. In a variable speed drive the combination of members as described in claim 23, whereby the return movement of the roller by a spring is controlled by a lock, retaining the roller in its displaced position until the outward movement of the pivoted lever engaging the stationary reaction member is concluded.

RICHARD M. HOFMANN.